Nov. 13, 1962     H. BOBST ETAL     3,063,263
OVERLOAD RELEASE COUPLING

Filed May 7, 1958     2 Sheets-Sheet 2

INVENTORS
HENRI BOBST
JOSEF KURY

BY
Watara, Roditi + Schwartz ATTORNEYS 3,063,263
OVERLOAD RELEASE COUPLING
Henri Bobst, Lausanne, and Josef Kury, Pully, Switzerland, assignors to J. Bobst & Son S.A., Prilly, Switzerland, a corporation of Switzerland
Filed May 7, 1958, Ser. No. 733,539
Claims priority, application Switzerland May 17, 1957
2 Claims. (Cl. 64—29)

The invention relates to improved coupling devices particularly adapted for use in platen presses.

It is an object of the present invention to provide a coupling adapted to transmit considerable power with abrupt starting and stopping.

A further object of the present invention is to provide a friction coupling sufficiently powerful to transmit all the force necessary for the normal working of a press, but insufficient to resist obstacles.

According to the invention there is provided apparatus comprising a pair of shafts in coaxial end-to-end relation, one of which shafts is adapted to be driven. A disc is coupled to the driven shaft for rotation therewith. Protrusions are provided on the disc in the shape of balls and are aligned in a circle concentric with the shafts. The apparatus further comprises housing means coupled to the other of the shafts for rotation therewith and enclosing said disc and protrusions. In further accordance with the invention there is provided yieldable members supported in the housing engaging each of the protrusions from opposite sides thereof for establishing driving connection between said disc and said housing. Each of the yieldable members includes a piston positioned parallel to the shafts and in driving contact with an associated protrusion. Each yieldable member further includes a spring engaging the piston for yieldably urging the same against the corresponding protrusion, whereby the pistons couple the housing to the shafts in driving relation to a limit torque value whereat said pistons are yieldably displaced out of contact with the protrusions.

The attached drawing shows an embodiment of the object of the invention, given by way of example.

Figure 1:
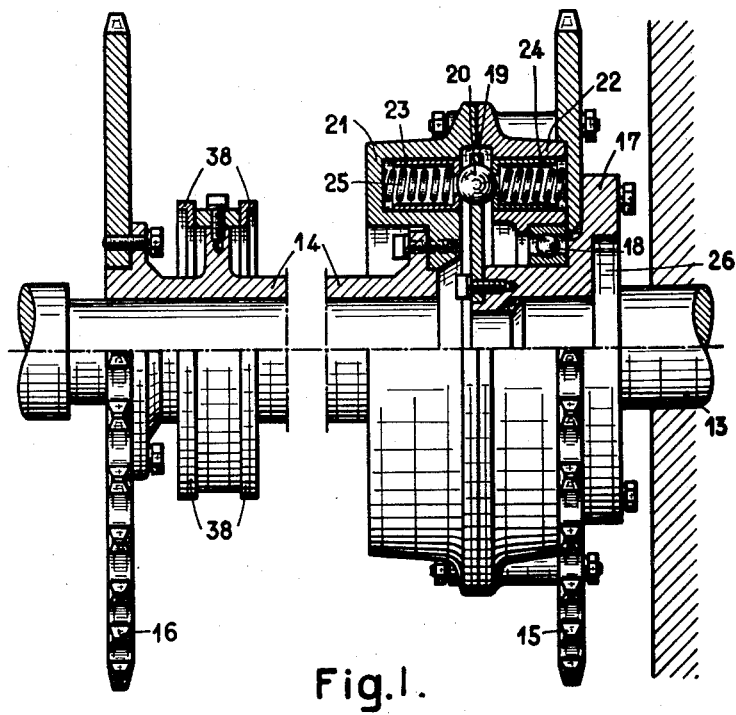
FIGURE 1 is a side view partially in section showing a coupling according to the invention.

In FIG. 1 a toothed sector (not shown) drives shaft 13 adapted for driving shaft 14 which supports driving chain wheels 15 and 16.

To shaft 13 is rotatively connected for this purpose sleeve 17 supporting ball bearings 18 and of a perforated disk 19.

Figure 2:
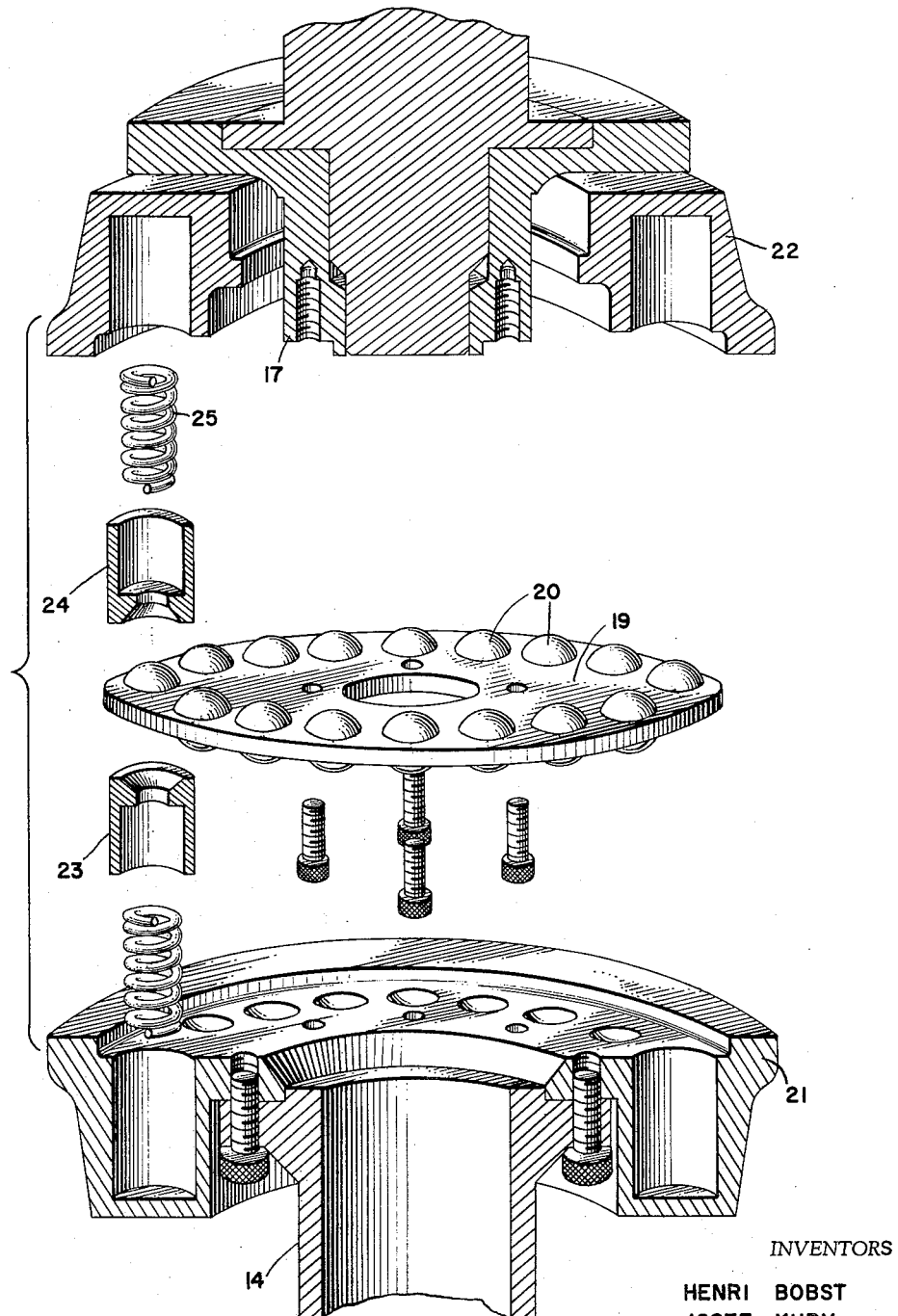
FIGURE 2 is an exploded view of a portion of the coupling of FIG. 1.

These perforations are evenly distributed over the entire circumference of a large circle and each contains a large steel ball 20 of such a diameter that it protrudes on both sides of the disk 19 of lesser thickness. The arrangement can be seen clearly in FIG. 2.

Two half-casings 21 and 22 forming a unit fitted together with the chain wheel 15 and the shaft 14 and supported on the ball bearing 18, constitute a drum surrounding the disk 19 and the balls 20.

In this drum are housed as many pairs of opposed hollow pistons 23 and 24 as there are balls 20 which are cupped by these pistons which are axially pushed towards each other by powerful springs 25. The piston ends engaging the balls are terminated as spherical housings.

It is clear that if the shaft 13 drives the disk 19 and the balls 20 these latter will drive in turn the pistons 23 and 24 and thus the drum made of half-casings 21 and 22, the chain wheel 15, the shaft 14 and the chain wheel 16.

If, however, the stress that balls 20 have to transmit through the intermediary of pistons 23 and 24 exceeds a given value as a consequence of a resistance exerted against a turning of the chain wheels 15 and 16, it is evident that the aforementioned pistons will tend to slide past the balls while compressing the springs 25.

There thus results a friction coupling which at predetermined torque depending upon the number of balls, their diameters, the amount by which the pistons engage them and the power of the springs acting on these latter, decouples the driven and driving members.

However, the guarantee offered by this coupling is not by itself generally sufficient, for it appears desirable and often indispensable that the press be stopped smoothly just as an interruption occurs in its normal working.

What we claim is:

1. In a press for working sheet material, apparatus comprising: a pair of shafts in coaxial end to end relation, one of said shafts being adapted to be driven, a disc coupled to said one shaft for rotation therewith, protrusions on said disc and aligned in a circle concentric with said shafts, housing means coupled to the other said shaft for rotation therewith and enclosing said disc and protrusions, and yieldable members supported in said housing engaging each of the protrusions from opposite sides thereof for establishing driving connection between said disc and said housing, each said yieldable member including a piston positioned parallel to said shafts and in driving contact with the associated protrusion, and a spring engaging the piston for yieldably urging the same against the corresponding protrusion whereby said pistons couple said housing to said shafts in driving relation to a limit torque value whereat said pistons are yieldably displaced out of contact with said protrusions.

2. Apparatus as claimed in claim 1 wherein said protrusions are balls.

References Cited in the file of this patent

UNITED STATES PATENTS

| | | |
|---|---|---|
| 1,555,098 | Benko | Sept. 29, 1925 |
| 1,883,164 | Vassakos | Oct. 18, 1932 |
| 2,025,108 | Hogg | Dec. 24, 1935 |
| 2,068,745 | Hall | Jan. 26, 1937 |
| 2,578,650 | Wright | Dec. 11, 1951 |
| 2,753,029 | Babaian | July 3, 1956 |
| 2,781,883 | Rode | Feb. 19, 1957 |
| 2,802,354 | Bohnhoff et al. | Aug. 13, 1957 |
| 2,806,366 | Woestemeyer | Sept. 17, 1957 |

FOREIGN PATENTS

| | | |
|---|---|---|
| 622,246 | Germany | Nov. 23, 1935 |
| 740,943 | Germany | Nov. 6, 1943 |